Patented May 5, 1931

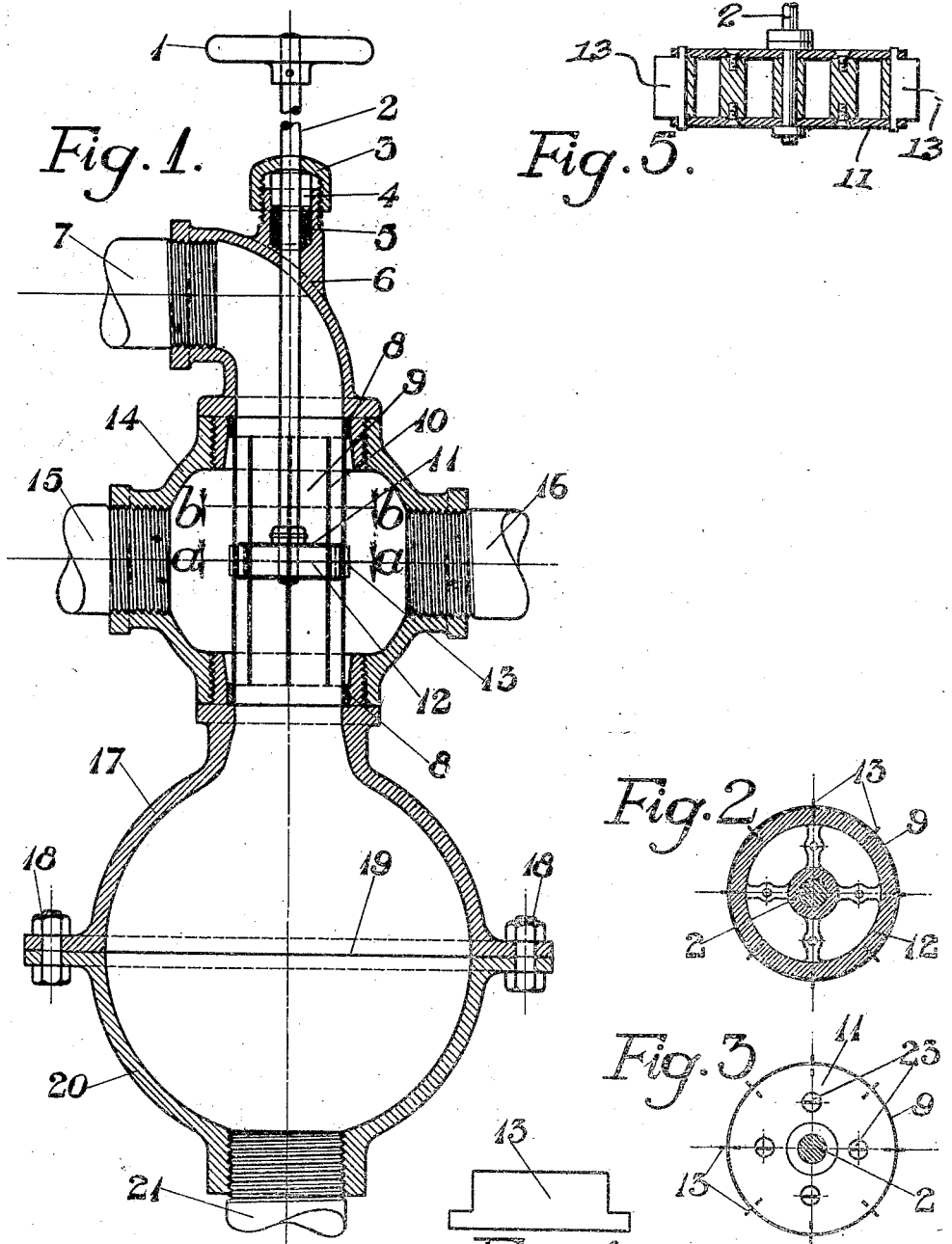

1,803,477

UNITED STATES PATENT OFFICE

MARTIN J. KULLANDER, OF CALUMET CITY, ILLINOIS

STRAINER VALVE

Application filed September 26, 1927. Serial No. 222,028.

This invention relates to an improved strainer valve, and has for one of its principal objects the provision of a valve used in pipe lines or in intake pipes, which shall include a straining element, whereby mud, sand, grit, fish, and other foreign material are effectively prevented from entering the water passing through the valve or through the intake.

One of the important objects of this invention is to provide, in a strainer valve, a straining element which can be readily and economically cleaned by a very simple operation, and without necessitating the stoppage of the flow of other liquid through the valve.

Another and further important object of this invention is to provide a pipe strainer, which, in addition to removing foreign material from the water or other liquid passing therethrough, will deposit the same in such a way as to enable this sediment or mud to be readily collected, as for example, for analytical purposes in chemical laboratories or in industrial processes, or for the recovery of by-products which would otherwise be wasted.

Another and still further important object of the invention is to provide, in a pipe strainer, elements for straining the liquid passing through the pipe, and elements cooperating therewith for readily and economically cleaning the strainer without interfering with the operation of the mechanism of which the pipe forms a part, and further, without necessitating the taking apart of the strainer or valve, or of removing the same from its position, as in the case of an intake pipe.

Another and still further important object of the invention is to provide, in a strainer valve, manually or mechanically operated means for cleaning the strainer while in operation, which means themselves are renewable or replaceable in the event of impaired usefulness after a long period of operation.

Other and further important objects of the invention will be apparent from the disclosures in the accompanying drawings and following specification.

The invention, in a preferred form, is illustrated in the drawings and hereinafter more fully described.

In the drawings:

Figure 1 is a vertical sectional view of the improved strainer valve of this invention.

Figure 2 is a horizontal sectional view, taken on the line a—a of Figure 1, looking in the direction indicated by the arrows.

Figure 3 is a sectional view, taken on the line b—b of Figure 1, looking in the direction indicated.

Figure 4 is a detail view of one of the strainer cleaning elements.

Figure 5 is a vertical section of the strainer cleaning element shown in horizontal section in Figure 2 and in plan view in Figure 3.

As shown in the drawings:

The sectional elevation of Figure 1 includes an operating handle or the like 1 attached to a stem 2 passing through a packing nut comprising a cap 3 fastened to a screw-threaded nipple 4 in which is placed suitable packing material 5. This is mounted on an upper integral portion 6 of the valve casing to which is affixed an intake pipe 7.

Mounted below the valve casing 6 and affixed therein by means of packing washers or the like 8 is a strainer element 9, comprising preferably a metal cylinder, having slits 10 therein, in which operates a cleaner composed of discs 11 mounted on an annular ring 12, in the outer edges of which are affixed suitable cleaning elements 13, all as shown in detail in Figures 2, 3, and 4. The discs 11 operate to maintain the cleaning elements 13 in position in the annular ring 12, inasmuch as the cleaning elements or blades 13 have integral extensions, as shown in Figure 4, which project upwardly and downwardly through suitable openings in the discs 11 when the same are fastened in position on the annular ring 12 by means of screws, as shown at 23.

This strainer is positioned in a casing 14, which has outlet pipes 15 and 16 extending therefrom, and it will be obvious that any number of strainers may be used and any number of casings or inlet pipes, depending upon the amount of flow or capacity of the plant, where the device is used.

Extending below the casing 14 is a spherical container composed of two portions 17 and 20 joined together by means of bolts or the like 18, and preferably rendered liquid-tight by means of a gasket or the like 19. The container empties into a pipe 22, which may be controlled by a suitable valve.

The strainer 9 may be readily cleaned by simply lifting and depressing the handle attached to the stem 2 one or more times, moving the cleaning blades 13 in the slots 10, thereby freeing the same from mud, débris, sand, etc., which might accumulate thereon and at the same time allowing such débris to fall into the chamber 17—20.

Further, the member 12 with its attached discs 11 may be used as a valve element, if desired, simply by raising the stem 2 to its uppermost limit of movement, and fastening the same in such position in any convenient manner.

It will be obvious that herein is provided a pipe strainer, which will simply and effectively remove débris and foreign material from liquids passing through the pipe, and which can be readily and economically cleaned at all times, and at very short notice, without stopping the operation of the pipes, or interfering with the flow of liquid therethrough in any way. Further, the device is so arranged that all of the precipitated material may be readily recovered, if desired, for use as a by-product, or if samples are desired for analysis.

Also, the device operates as a valve for complete shut-off of passage of fluid therethrough, if desired.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A strainer valve, including in combination, a valve body, inlet and outlet pipes attached to the body, a slitted cylindrical strainer in the body, and means for cleaning said strainer while in operation, said cleaner means additionally acting as a valve closure element, said combination cleaner and valve element including an annular member fitted in the strainer and contacting with the inner walls thereof, and blades removably mounted in the periphery of said annular member, and projecting through the slits in the strainer.

2. A strainer valve, including in combination, a valve body, inlet and outlet pipes attached to the body, a slitted cylindrical strainer in the body, and means for cleaning said strainer while in operation, said cleaner means additionally acting as a valve closure element, said combination cleaner and valve element including an annular member fitted in the strainer and contacting with the inner walls thereof, and strainer cleaner elements mounted in the outer periphery of the annular member and discs removably attached to the top and bottom of said annular member, said discs additionally operating as retaining means for the strainer cleaning elements.

3. A strainer valve, including in combination, a valve body, inlet and outlet pipes attached to the body, a slitted cylindrical strainer in the body, and means for cleaning said strainer while in operation, said cleaner means additionally acting as a valve closure element, said combination cleaner and valve element including an annular member fitted in the strainer and contacting with the inner walls thereof and strainer cleaner elements mounted in the outer periphery of the annular member, and discs removably attached to the top and bottom of said annular member, said discs additionally operating as retaining means for the strainer cleaning elements, said strainer cleaning elements comprising removable blades fitted into slots in the said annular ring and having shoulders fitted into slits in the disks.

In testimony whereof I affix my signature.

MARTIN J. KULLANDER.